United States Patent
Dobler

(10) Patent No.: US 6,870,919 B2
(45) Date of Patent: Mar. 22, 2005

(54) MUTE STATUS REMINDER FOR A COMMUNICATION DEVICE

(75) Inventor: Steve R. Dobler, Stanhope, NJ (US)

(73) Assignee: Intel Corporation, Santa Clara, CA (US)

(*) Notice: Subject to any disclaimer, the term of this patent is extended or adjusted under 35 U.S.C. 154(b) by 547 days.

(21) Appl. No.: 10/112,185

(22) Filed: Mar. 29, 2002

(65) Prior Publication Data
US 2003/0185371 A1 Oct. 2, 2003

(51) Int. Cl.[7] .......................... H04M 1/80; H04M 1/82; H04M 3/42
(52) U.S. Cl. .................. 379/207.02; 379/163; 379/164; 379/393; 379/421
(58) Field of Search ................................. 379/162, 163, 379/164, 201.01, 201.02, 207.02, 393, 421

(56) References Cited

U.S. PATENT DOCUMENTS

| | | | |
|---|---|---|---|
| 3,568,176 A | * | 3/1971 | Schouest ..................... 340/529 |
| 3,806,665 A | * | 4/1974 | Goldberg ..................... 379/163 |
| 4,731,822 A | * | 3/1988 | Berry et al. ............. 379/204.01 |
| 6,763,102 B1 | * | 7/2004 | Chen et al. ............. 379/221.15 |
| 2003/0194072 A1 | * | 10/2003 | MacNamara et al. .. 379/202.01 |

* cited by examiner

Primary Examiner—Harry S. Hong
(74) Attorney, Agent, or Firm—Buckley, Maschoff & Talwalkar LLC

(57) ABSTRACT

According to some embodiments, a mute status reminder is provided for a communication device.

28 Claims, 7 Drawing Sheets

400

| TELEPHONE CONFERENCE IDENTIFIER 402 | CALLER IDENTIFIER 404 | MUTE STATUS 406 | SPEECH INDICATION 408 | MUTE STATUS REMINDER 410 |
|---|---|---|---|---|
| TC101 | 212.555.1234 | NOT ACTIVE | SPEAKING | NO |
| TC101 | 203.555.6789 | ACTIVE | NOT SPEAKING | NO |
| TC101 | 202.555.8765 | ACTIVE | SPEAKING | YES |
| TC102 | 408.555.5432 | ACTIVE | NOT SPEAKING | NO |

FIG. 4

MUTE STATUS REMINDER FOR A COMMUNICATION DEVICE

BACKGROUND

A communication device may let a user exchange information with another user through a communication network. For example, a telephone lets a user speak to another user (and lets him or her hear what the other user is saying) via a telephone network. A computer adapted to provide telephone communication can similarly let a user talk to another user.

Occasionally, however, a user may want to prevent information from being transmitted to another communication device. Consider a first user who uses a telephone to place a telephone call to a second user. While the two users are talking to each other, the first user might want to speak with a friend or a co-worker without having the second user hear what he or she is saying. As another example, consider a user who participates in a telephone conference call. In this case, the user may want to prevent background or line noise from being transmitted to other participants (e.g., if he or she is using a speakerphone). This can be especially important when the conference call includes a large number of participants, because the combination of noise from many different telephones can be distracting.

It is known that a communication device can include a "mute feature" that lets a user prevent information from being transmitted to other communication devices. For example, a telephone may have a mute button that a user can press to activate a mute feature. When activated during a telephone call, the mute feature will prevent other participants in the telephone call from hearing what the user is saying—while still letting the user hear what the other participants are saying. Such a mute feature may be incorporated, for example, in the telephone itself or in a telephone conference call bridge (e.g., a participant may dial "*6" during a conference call to activate the mute feature for his or her telephone).

Of course, such a communication device also lets the user de-activate the mute feature. That is, the user can de-activate the mute feature when he or she wants to again allow information to be transmitted to other communication devices (e.g., the user may re-press a mute button when he or she wants to resume speaking to other users). It is not uncommon, however, for a user to forget to de-activate the mute feature when he or she attempts to communicate with other users. For example, a user may inadvertently begin to speak to other participants while the mute feature on his or her telephone is still active. In this case, the other participants will not hear what he or she is saying (nor will the user realize this fact). The resulting confusing can be annoying to all participants and may be especially embarrassing to the user.

To reduce this problem, some communication devices provide a mute status indication. For example, a telephone may have a small light that remains on while the mute feature is active. Unfortunately, even with this type of static indication many users still forget to de-activate the mute feature when they begin to speak. Moreover, it may not be practical to provide a mute status indication when a mute feature is incorporated in a device other than a user's telephone or computer. By way of example, when the mute feature is incorporated in a telephone conference call bridge, a participant's telephone might not be able to provide any indication whatsoever (e.g., the telephone might not have a light that can be controlled by the conference call bridge). Note that in this case, even a static reminder might be impractical (e.g., a periodic tone reminding a user that his or her mute feature is currently active might be too annoying for the user).

BRIEF DESCRIPTION OF THE DRAWINGS

FIG. 4 is a tabular representation of a portion of a telephone conference database according to one embodiment.

DETAILED DESCRIPTION

Some embodiments are associated with a mute status reminder for a "communication device." As used herein, the phrase "communication device" can refer to any device that lets a user exchange information with another user through a communication network. Examples of communication devices include wired or wireless telephones, computers adapted to provide telephone communication, and hardware units (e.g., boards) or software applications that enable a computer to provide telephone communication. A communication device may also be, for example, a telephone conference call bridge.

Communication Device

Figure 1:
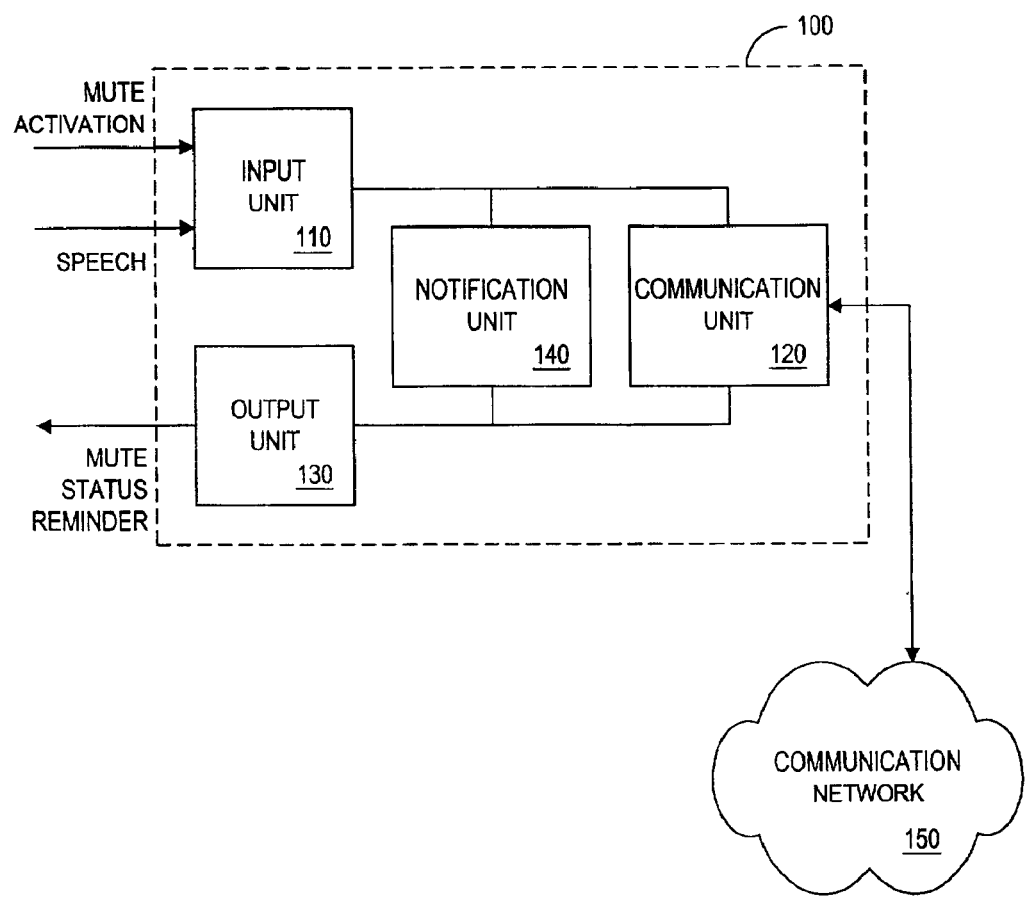
FIG. 1 is a block diagram of a communication device according to some embodiments.

Turning now in detail to the drawings, FIG. 1 is a block diagram of a communication device 100 according to some embodiments. The communication device 100 includes an input unit 110 that receives information. The input unit 110 may include, for example, a microphone adapted to receive a user's speech. The input unit 110 may also include a telephone keypad or a similar control device (e.g., a telephone function button), a video camera, a keyboard, and/or a computer mouse or other pointing device.

The communication device 100 also includes an output unit 130 that provides information. The output unit 130 may include, for example, a speaker adapted to provide audio information to a user. The output unit 130 may also include a display, such as a Light Emitting Diode (LED) display, a Liquid Crystal Display (LCD) device, and/or a computer monitor.

The input unit 110 and the output unit 130 are coupled (i.e., directly or indirectly coupled) to a communication unit 120 that is adapted to exchange information via a communication network 150. The communication network 150 may comprise, for example, a telephone network such as a Public Switched Telephone Network (PSTN), a wireless network, or a network associated with a Private Branch Exchange (PBX) device. The communication network 150 may also comprise a Local Area Network (LAN), a Metropolitan Area Network (MAN), a Wide Area Network (WAN), a proprietary network, a Wireless Application Protocol (WAP) network, and/or an Internet Protocol (IP) network such as the Internet, an intranet or an extranet. Note that the communication network 150 may include a number of different networks.

In this way, the communication device 100 can be used to communicate with others through the communication network 150 (e.g., via other communication devices). For example, the communication device 100 may let a user participate in a conversation with one or more other users. That is, the user may speak to the other users via the input unit 110 (e.g., a microphone) and listen to them via the output unit 130 (e.g., a speaker).

According to one embodiment, the communication device 100 is a wired or wireless telephone. In this case, the input unit 110 may include a microphone and a telephone keypad including Dual Tone Multi-Frequency (DTMF) buttons and telephone feature buttons. The output unit 130 may include a speaker and a display device such as an LCD device and one or more LEDs. The communication device 100 maybe, for example, a speakerphone.

According to another embodiment, the communication device 100 is a computer adapted to provide telephone communication (e.g., a "soft phone"). For example, the communication device 100 may be a Personal Computer (PC) with one or more INTEL® DIALOGIC® telecom boards that incorporate Computer Telephony (CT) capabilities. In this case, the input unit 110 may include a microphone, a video camera, a keyboard, and/or a pointing device (e.g., a computer mouse or trackball). The output unit 130 may include a speaker and a display device (e.g., a computer monitor). Similarly, the communication device 100 may be a portable computer such as a laptop or Personal Digital Assistant (PDA) adapted to provide telephone communication.

According to some embodiments, the communication device 100 incorporates a mute feature that a user can activate to prevent information from being transmitted through the communication network 150. For example, the user may activate the mute feature via the input unit 110 (e.g., by pressing a telephone function button). The mute feature may be incorporated in, for example, the communication unit 120.

The communication device also includes a notification unit 140. As will now be described, the notification unit 140 communicates with the input unit 110 and the output unit 130 to provide a mute status reminder when a mute feature is active and a communication signal is detected. According to some embodiments, a user can select whether or not he or she should receive such mute status reminders.

For example, the notification unit 140 might analyze information received via the input unit 110 when the mute feature is active to determine if a user is currently speaking, such as by detecting when the user's speech causes a communication signal to exceed a pre-determined energy threshold. According to some embodiments, different users can be associated with different thresholds (e.g., the thresholds might be selected by users or be determined by the communication controller 300 based on historic user information).

If the notification unit 140 determines that the user is speaking while the mute feature is active, a mute status reminder is provided via the output unit 130. The mute status reminder may be, for example, audio information such as a tone or message that is provided to the user. In the case of an audible message, the mute status reminder might be associated with a pre-recorded message (e.g., stored on a hard disk drive or in memory), a voice file, and/or a voice synthesis process (e.g., via a PC soundboard or a telephone's processor).

The mute status reminder may also comprise visual information such as a light, a text message (e.g., via an LCD device or a computer monitor), and/or a graphical image (e.g., an icon). The mute status reminder might also be executable information (e.g., information provided via a JAVA™ applet). According to still another embodiment, the mute status reminder is provided to the user via a mechanical vibrator assembly (e.g., which can also be used in place of a wireless telephone's audible ring).

Note that the mute status reminder could be a supplemental indication that is provided to the user in addition to an existing static indication. For example, a telephone might have a small light that remains on whenever the mute feature is active (i.e., whether or not the user is currently speaking). In this case, an audio tone could be provided in addition to the light if the user begins to speak while the mute feature is active.

According to another embodiment, the mute status reminder is an adjustment to an existing indication. Consider again the telephone with the light that remains on whenever the mute feature is active. In this case, the light could begin to flash if the user speaks while the mute feature is active. Of course, a number of different types of reminders might be provided to the user (e.g., an audio tone and a graphical icon).

Note that one or more of the input unit 110, the communication unit 120, the output unit 130, and the notification unit 140 may be incorporated into a single piece of hardware or software application.

Communication System

Figure 2:
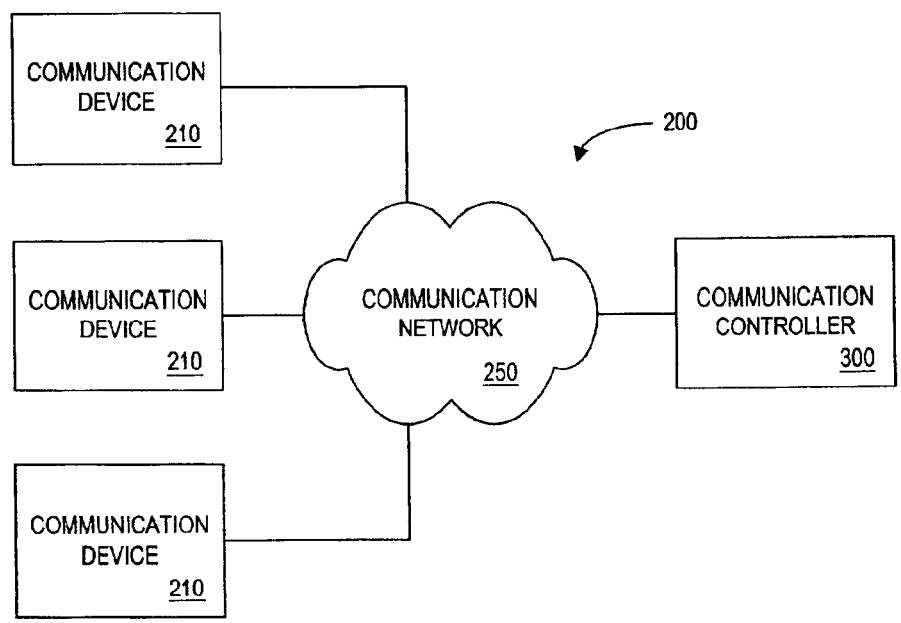
FIG. 2 is a block diagram of a communication system according to some other embodiments.

FIG. 2 is a block diagram of a communication system 200 according to some other embodiments. The communication system 200 includes a communication controller 300 that exchanges information with a number of communication devices 210 via a communication network 250. The communication devices 210 and communication network 250 may be, for example, any of the types of devices and networks described with respect to FIG. 1.

The communication controller 300 may be, for example, a telephone conference call bridge that enables multiple users to participate in a conference call. Such a conference call bridge may be, for example, associated with a PBX device, an INTEL® Converged Communications Platform, or a third-party service (e.g., an AT&T® conference call service).

Note that the communication controller 300 may include an internal communication unit that acts as both an input unit and output unit (e.g., an internal communication port in the communication controller 300 might receive information from external communication devices 210 and provide information to external communication devices 210). Also note that although a single communication controller 300 is shown in FIG. 2, any number of communication controllers 300 may be included in the communication system 200.

In this way, the communication controller 300 can be used to let remote users communicate with each other through the communication network 250 (e.g., via the communication devices 210). For example, three users may each place a telephone call to the communication controller 300 via different communication devices 210. The communication controller 300 can then arrange for those users to participate in a conference call.

According to some embodiments, the communication controller 300 incorporates a mute feature that users can activate to prevent information from being transmitted through the communication network 250. For example, a conference call participant might activate the mute feature by dialing "*6" via his or her telephone's DTMF keypad. The communication controller 300 would then prevent that participant's speech from being transmitted to other participants.

The communication device 300 may also include a notification unit (e.g., a software application). According to some embodiments, the notification unit is adapted to provide a mute status reminder when a mute feature is active for a communication device 210 and a communication signal is detected from that communication device 210. For example, the communication controller 300 might analyze information received from the communication device 210 to determine if a conference call participant is speaking while his or her mute feature is active (e.g., by detecting when the participant's speech causes a communication signal to exceed a pre-determined energy threshold or by detecting an utterance using a speech recognition process).

If the communication controller 300 determines that the participant is speaking while his or her mute feature is active, the mute status reminder may be provided to the user via the communication device 210. The mute status reminder maybe, for example, audio information such as a tone or message that is provided to the participant through the communication network 250. The mute status reminder may also be any of the types of reminders described with respect to FIG. 1. According to some embodiments, the communication controller 300 arranges for a communication device 210 to provide the mute status reminder to the participant using an analog signal (e.g., an in-band frequency-shift keying message) or a digital signal (e.g., via a control signal path).

Note that the communication controller 300 may be adapted to provide a plurality of mute status reminders via a plurality of communication devices 210 (e.g., a number of different telephones) associated with one or more telephone conference calls.

Communication Controller

Figure 3:
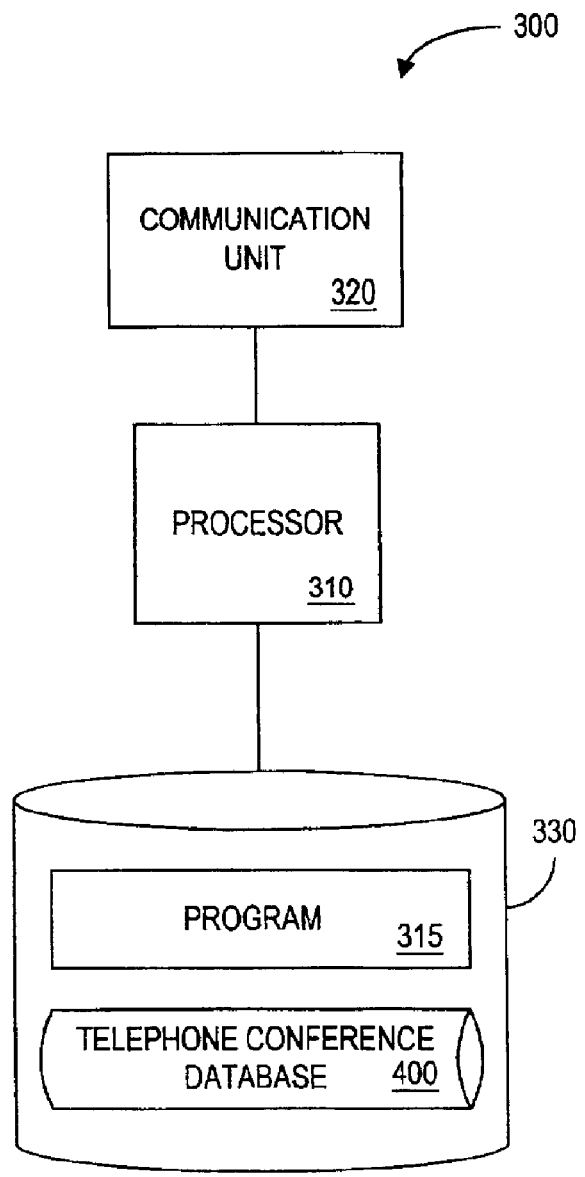
FIG. 3 is a block diagram of a communication controller according to one embodiment.

FIG. 3 illustrates a communication controller 300 that is descriptive of the device shown, for example, in FIG. 2 according to some embodiments. The communication controller 300 includes a processor 310, such as one or more INTEL® PENTIUM® processors. The processor 310 is coupled to a communication unit 320 which may be adapted to communicate with, for example, a number of different communication devices 210 participating in a telephone conference call. That is, the communication unit 320 may act as input unit (e.g., by receiving information from other devices) and an output unit (e.g., by providing information to other devices).

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315. For example, the processor 310 may receive an indication that a mute feature is active for a communication device 210. The processor may also detect a communication signal via the communication device 210 and arrange for a mute status reminder to be provided in response to the communication signal.

According to one embodiment, the processor 310 receives an indication that a user has activated a mute feature for a telephone. The processor 310 then detects that the user is speaking via the telephone and provides a mute status reminder to the user via the telephone in response to the detection.

As used herein, information may be "received" by or "transmitted" to a software application or module within the communication controller 300 from: (i) a communication device 210, (ii) another software application or module within the communication controller 300, or (iii) any other source.

As shown in FIG. 3, the storage device 330 also stores a telephone conference database 400. An example of a database that may be used in connection with the communication controller 300 will now be described in detail with respect to FIG. 4. The illustration and accompanying description of the database presented herein is exemplary, and any number of other database arrangements could be employed besides those suggested by the figure.

Telephone Conference Database

Referring to FIG. 4, a table represents the telephone conference database 400 that may be stored at the communication controller 300 according to one embodiment. The table includes entries identifying participants in telephone conference calls. The table also defines fields 402, 404, 406, 408, 410 for each of the entries. The fields specify: a telephone conference identifier 402, a caller identifier 404, a mute status 406, a speech indication 408, and a mute status reminder 410. The information in the telephone conference database 400 may be created and updated, for example, based on information received from communication devices 210 (e.g., telephones being used to participate in a conference call).

The telephone conference identifier 402 may be, for example, an alphanumeric code associated with a telephone conference call. The caller identifier 404 may be associated with a participant in the conference call or his or her communication device 210 (e.g., the caller's telephone number, user name, or IP address). For example, the first three entries in FIG. 4 indicate that three callers are participating in a single telephone conference call.

The mute status 406 may indicate whether or not a mute feature is active for the participant, and the speech indication 408 may represent whether or not the participant is currently speaking (e.g., based on a communication signal received from the participant's communication device 210 and a predetermined energy threshold). The mute status reminder 410 indicates whether or not a mute status reminder 410 is being (or should be) provided to the participant (e.g., based on the mute status 406 and the speech indication 408).

By way of example, consider the first entry in the telephone conference database 400. In this case, the participant's mute status 406 is "not active," so the mute status reminder 410 is "no" even though the speech indication 408 shows that the participant is currently "speaking." Similarly, the mute status reminder 410 in the second entry is "no" because that participant is "not speaking" (i.e., even though his or her mute status 406 is "active"). In the third entry, however, the mute status reminder 410 is "yes" because that participant is "speaking" and his or her mute status 406 is "active." In this case, audio or image information may be provided to remind the participant that his or her speech is not being heard by the other participants.

Mute Status Reminder Methods

Figure 5:
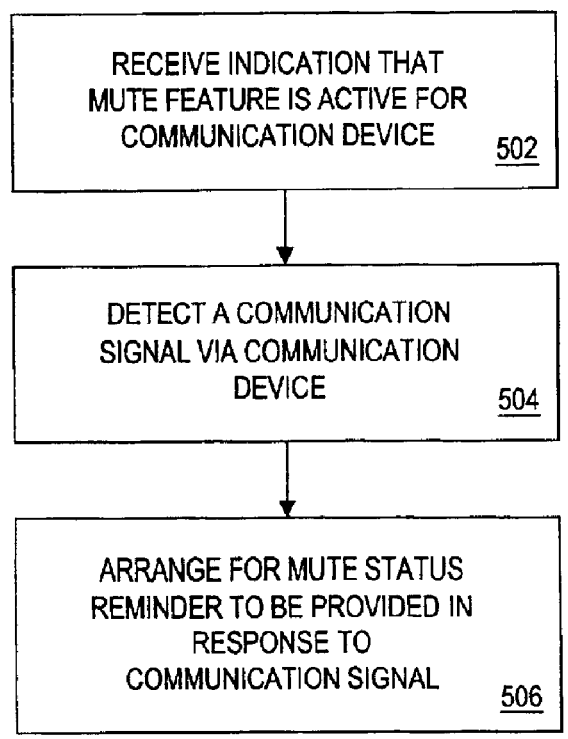
FIG. 5 is a flow chart of a method of facilitating communication according to some embodiments.

FIG. 5 is a flow chart of a method of facilitating communication that may be performed, for example, by the communication device 100 shown in FIG. 1 or the communication controller 300 shown in FIGS. 2 and 3 according to some embodiments. The flow charts in FIG. 5 and the other figures described herein do not imply a fixed order to the steps, and embodiments can be practiced in any order that is practicable.

Figure 6:
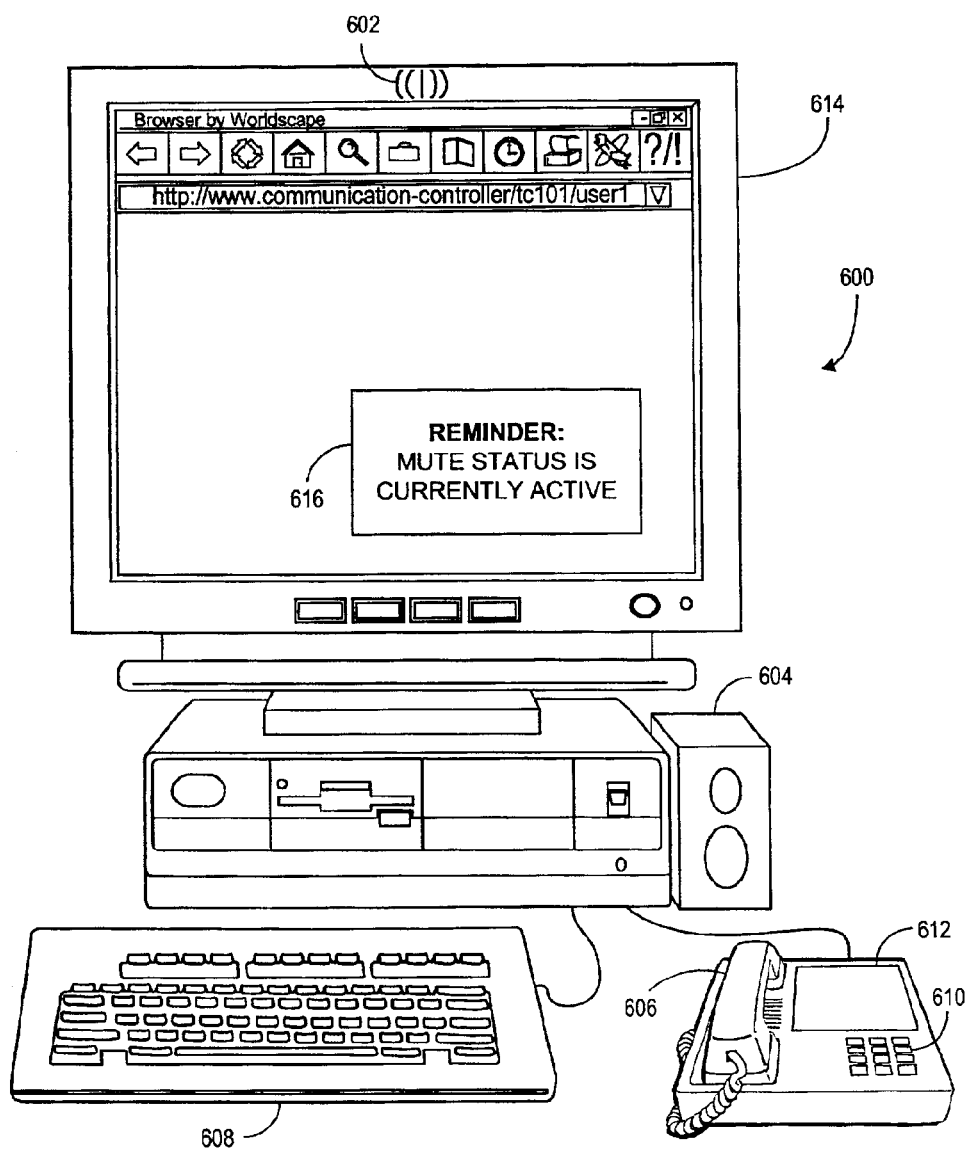
FIG. 6 illustrates a communication device according to some embodiments.

At 502, an indication is received that a mute feature is active for a communication device. This may occur, for example, when a user activates a mute feature for the communication device. Consider, for example, FIG. 6 which illustrates a communication device 600 according to some embodiments. In this case, the user may activate the mute feature via a telephone handset 606 (e.g., through a speech recognition process), a telephone keypad 610, and/or a computer keyboard 608.

At 504, a communication signal is detected via the communication device. The communication signal may indicate, for example, that the user is currently speaking (e.g., when the communication signal exceeds a predetermined energy threshold). The communication signal may be based on, for example, information received via the telephone handset 606 (or another microphone incorporated in the telephone) and/or an independent microphone 602.

At 506, it is arranged for a mute status reminder to be provided in response to the communication signal. The mute status reminder may be provided to the user, for example, as a message 616 on a computer monitor 614, an audio tone via the telephone handset 606 (or a speaker incorporated in the telephone) or an independent speaker 604, and/or a telephone LCD display 612.

Figure 7:
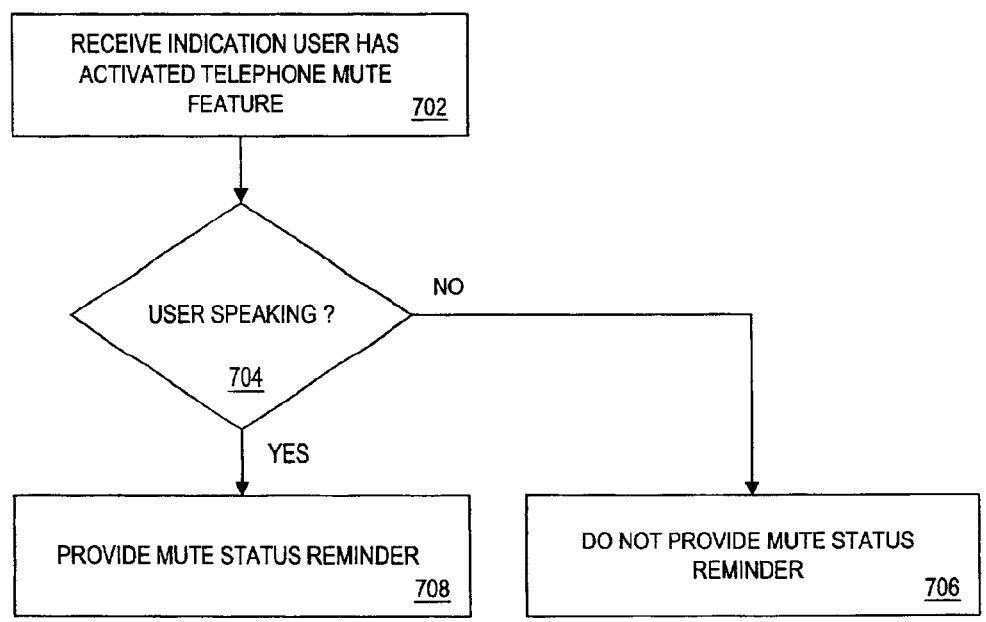
FIG. 7 is a flow chart of a computer-implemented method according to some embodiments.

FIG. 7 is a flow chart of a computer-implemented method that may be performed, for example, by the communication device 100 shown in FIG. 1 or the communication controller 300 shown in FIGS. 2 and 3 according to some embodiments.

At 702, an indication is received that a user has activated a mute feature for a telephone. When the method is being performed by a communication device 100, for example, such an indication may be received via the input unit 110. When the method is being performed by a communication controller 300, such an indication may be received via the communication network 250. In this case, the communication controller 300 may update the mute status 406 to "active" in the telephone conference database 400.

If it is not detected that the user is speaking via the telephone at 704, a mute status reminder is not provided at 706. When the method is being performed by a communication device 100, the notification unit 140 may determine that the user is not speaking via the input unit 110. When the method is being performed by a communication controller 300, the speech indication 408 may be set to "not speaking" and the mute status reminder 410 may be set to "no" in the telephone conference database 400.

If, however, it is detected that the user is speaking via the telephone at 704, a mute status reminder is provided at 708. When the method is being performed by a communication device 100, the notification unit 140 may determine that the user is speaking via the input unit 110 and arrange for the mute status reminder to be provided via the output unit 130. When the method is being performed by a communication controller 300, the speech indication 408 may be set to "speaking" and the mute status reminder 410 may be set to "yes" in the telephone conference database 400.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some embodiments described herein are directed to telephones, embodiments can also be used with other types of communication devices. For example, a video conference device, a walkie-talkie, and/or a radio communication device could provide a mute status reminder to a user.

Moreover, although some embodiments have been described with respect to a "mute" status reminder, other types of reminders can similarly be provided. For example, an "on hold" status reminder may be provided when a user attempts to speak while a telephone call has been placed on hold.

According to some other embodiments, an activate mute feature is automatically de-activated when a user begins to speak. In this case, the mute status reminder may in fact warn the user that the mute feature has been de-activated for his or her communication device.

The several embodiments described herein are solely for the purpose of illustration. Persons skilled in the art will recognize from this description other embodiments may be practiced with modifications and alterations limited only by the claims.

What is claimed is:

1. A communication device, comprising:
an input unit;
an output unit; and
a notification unit adapted to communicate with said input unit and said output unit and to provide a mute status reminder via said output unit when a mute feature is active and a communication signal is detected via said input unit.

2. The communication device of claim 1, wherein: (i) the communication device is associated with a user, (ii) the mute feature prevents the user's speech from being provided to at least one other communication device, and (iii) the communication signal is associated with the user's speech.

3. The communication device of claim 2, wherein said notification unit provides the mute status reminder when the user's speech causes the communication signal to exceed a pre-determined energy threshold.

4. The communication device of claim 1, wherein the mute status reminder comprises at least one of: (i) audio information, (ii) visual information, (iii) text information, (iv) executable information, (v) a supplemental mute status indication, and (vi) an adjustment to a mute status indication.

5. The communication device of claim 1, wherein the communication device comprises at least one of: (i) a telephone and (ii) a wireless telephone.

6. The communication device of claim 5, wherein said input unit comprises at least one of: (i) a microphone and (ii) a telephone keypad.

7. The communication device of claim 6, wherein the communication device is further adapted to receive an indication that the mute feature is active via said input unit.

8. The communication device of claim 5, wherein said input unit comprises a microphone and the communication signal is associated with a user's speech into said microphone.

9. The communication device of claim 5, wherein said output unit comprises at least one of: (i) a speaker, and (ii) a display device.

10. The communication device of claim 1, wherein the communication device comprises at least one of: (i) a computer, (ii) a personal computer, and (iii) a portable computer.

11. The communication device of claim 10, wherein said input unit comprises at least one of: (i) a keyboard, (ii) a pointing device, and (iii) a microphone.

12. The communication device of claim 10, wherein said output unit comprises at least one of: (i) a speaker, and (ii) a display device.

13. The communication device of claim 1, wherein the communication device comprises at least one of: (i) a communication controller, and (ii) a telephone conference call bridge.

14. The communication device of claim 13, wherein said input unit and said output unit are associated with a communication unit adapted to exchange information via a communication network.

15. The communication device of claim 14, wherein the communication network comprises at least one of: (i) the Internet, (ii) an intranet, (iii) a public network, (iv) a telephone network, (v) a proprietary network, (vi) a wireless network, and (vii) a local area network.

16. The communication device of claim 14, wherein the communication network is a telephone network and said notification device is adapted to provide a plurality of mute status reminders via a plurality of telephones associated with a telephone conference call.

17. A method of facilitating communication, comprising:
receiving an indication that a mute feature is active for a communication device;
detecting a communication signal via the communication device; and
arranging for a mute status reminder to be provided in response to the communication signal.

18. The method of claim 17, wherein said receiving, detecting, and arranging are performed via at least one of: (i) a telephone, (ii) a computer adapted to provide telephone communication, and (iii) a telephone conference call bridge.

19. An apparatus, comprising:
a processor; and
a storage device adapted to communicate with said processor and storing instructions adapted to be executed by said processor to:
receive an indication that a mute feature is active for a communication device;
detect a communication signal via the communication device; and
arrange for a mute status reminder to be provided in response to the communication signal.

20. The apparatus of claim 19, wherein said storage device further stores a telephone conference database.

21. The apparatus of claim 19, wherein said processor is further adapted to communicate with at least one of: (i) an input unit, (ii) an output unit, (iii) a notification unit, (iv) a communication unit, (v) a communication device, and (vi) a communication controller.

22. A computer-implemented method of facilitating communication, comprising:
receiving an indication that a mute feature is active for a communication device;
detecting a communication signal via the communication device; and
arranging for a mute status reminder to be provided in response to the communication signal.

23. The method of claim 22, wherein said receiving, detecting, and arranging are performed via at least one of: (i) a telephone, (ii) a computer adapted to provide telephone communication, and (iii) a telephone conference call bridge.

24. A medium storing instructions adapted to be executed by a processor to perform a method of facilitating communication, said method comprising:
receiving an indication that a user has activated a mute feature for a telephone;
detecting that the user is speaking via the telephone; and
providing a mute status reminder to the user via the telephone in response to said detection.

25. The medium of claim 24, wherein said receiving, detecting, and providing are performed via at least one of: (i) a telephone, (ii) a computer adapted to provide telephone communication, and (iii) a telephone conference call bridge.

26. An apparatus, comprising:
a first input port to receive a mute activation signal;
a second input port to receive a speech signal; and
an output port to provide a mute status reminder signal when (i) the mute activation signal indicates that a mute feature is active and (ii) the speech signal indicates that a user is speaking.

27. The apparatus of claim 26, wherein the mute activation signal is received via at least one of: (i) the user, (ii) a telephone, and (iii) a computer.

28. The apparatus of claim 26, wherein the mute status reminder signal is provided via at least one of: (i) a speaker, (ii) a display device, (iii) audio information, and (iv) visual information.

* * * * *